United States Patent [19]

Row

[11] Patent Number: 5,007,893

[45] Date of Patent: Apr. 16, 1991

[54] COMBINATION ANTI-G AND PRESSURE SUIT

[76] Inventor: Roderick J. Row, P.O. Box 923, Destin, Fla. 32541

[21] Appl. No.: 169,049

[22] Filed: Mar. 16, 1988

[51] Int. Cl.$^5$ .............................................. A62B 17/00
[52] U.S. Cl. ................................... 600/20; 128/201.29
[58] Field of Search ....................... 128/201.29, 202.11, 128/24 R, 38–40; 2/2.1 A; 600/19, 20

[56] References Cited

U.S. PATENT DOCUMENTS

| | | |
|---|---|---|
| 2,228,115 | 1/1941 | Holste . |
| 2,335,474 | 11/1943 | Beall . |
| 2,379,497 | 3/1945 | Sellmeyer .......................... 600/20 |
| 2,495,316 | 1/1950 | Clark et al. . |
| 2,667,459 | 1/1954 | Besler . |
| 2,871,840 | 2/1959 | Chatham et al. . |
| 3,071,128 | 1/1963 | Cramer . |
| 3,089,482 | 5/1963 | Gray . |
| 3,137,290 | 6/1964 | Gongwer . |
| 3,158,149 | 11/1964 | Gray . |
| 3,461,855 | 8/1969 | Brown et al. ..................... 600/20 |
| 3,509,893 | 5/1970 | Robertson . |
| 3,528,414 | 9/1970 | Schueller ...................... 128/202.11 |
| 3,667,459 | 6/1972 | Durney . |
| 3,734,078 | 5/1973 | Cramer et al. . |
| 3,751,727 | 8/1973 | Shepard et al. . |
| 4,243,024 | 6/1981 | Crosbie et al. . |
| 4,421,109 | 12/1983 | Thornton ......................... 600/20 |
| 4,534,338 | 6/1985 | Crosbie et al. . |
| 4,546,491 | 10/1985 | Beaussant . |
| 4,583,522 | 4/1986 | Aronne ........................... 128/24 R |

OTHER PUBLICATIONS

Grayton, A. C., Textbook of Medical Physiology, The Circulation, pp. 226–227 (1986).
Grayton, A. C., Textbook of Medical Physiology, Aviation, High Altitude and Space Physiology, pp. 547–548 (1986).
Grayton, A. C., Textbook of Medical Physiology, Physics of Blood, Blood Flow, and Pressure, Hemodynamics, page containing FIG. 18–13 (1986).
Hanrahan, J. S., Space Biology, Chapter 7 (Anti-G Devices), pp. 95–107, 232–234 (1960).

*Primary Examiner*—Randall L. Green
*Assistant Examiner*—K. M. Reichle

[57] ABSTRACT

A combined anti-G and pressure suit intended for use in a high performance aircraft includes a helmet into which is fed respiratory air and a cooperating body suit comprised of a plurality of air-tight toroidal air segments which surround the wearer's body from the neck to the feet and which, independently, are pressurized so as to match the fluid pressure in each segment to body fluid pressures resulting from vertical accelerations of the aircraft.

7 Claims, 14 Drawing Sheets

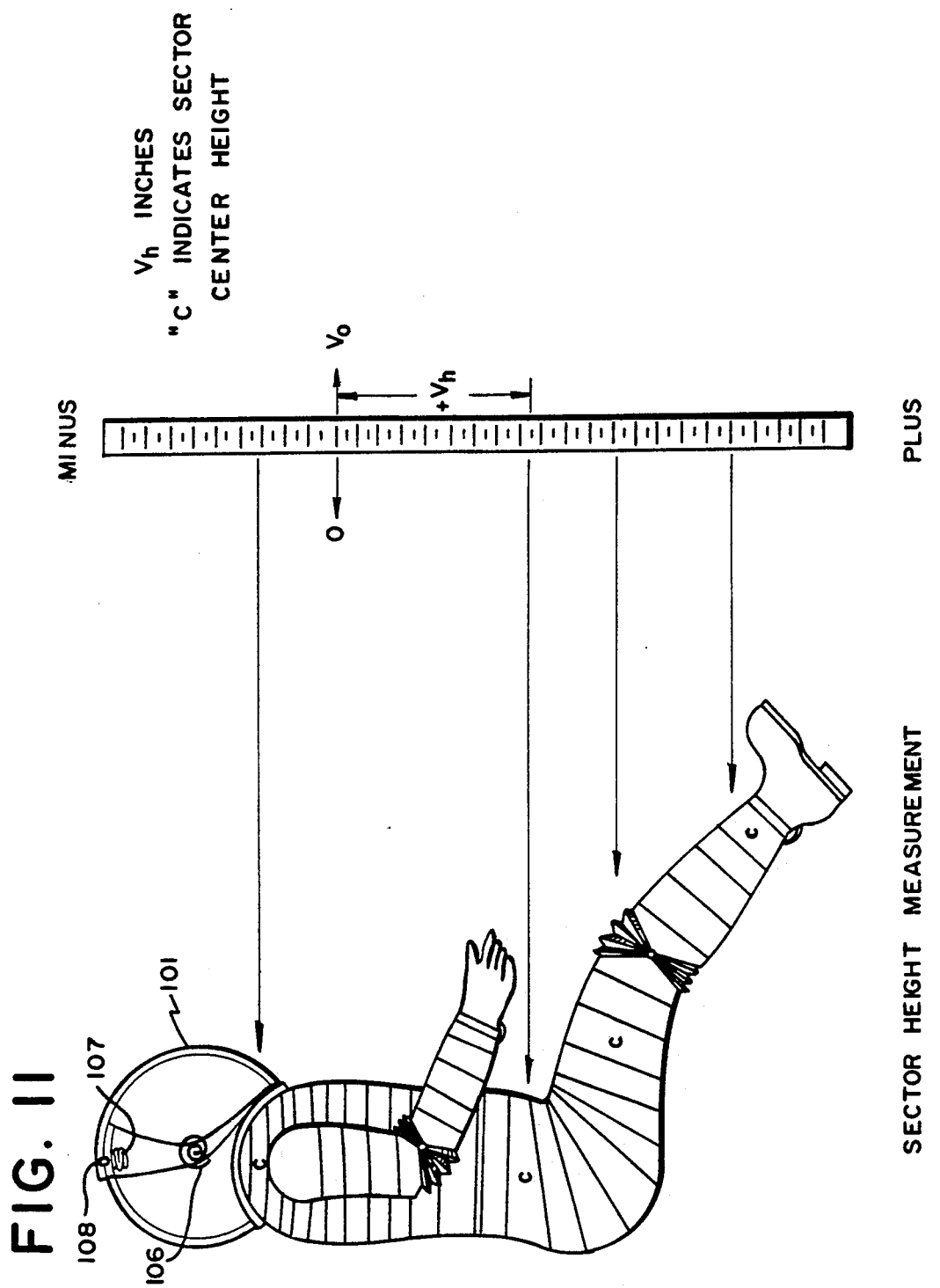

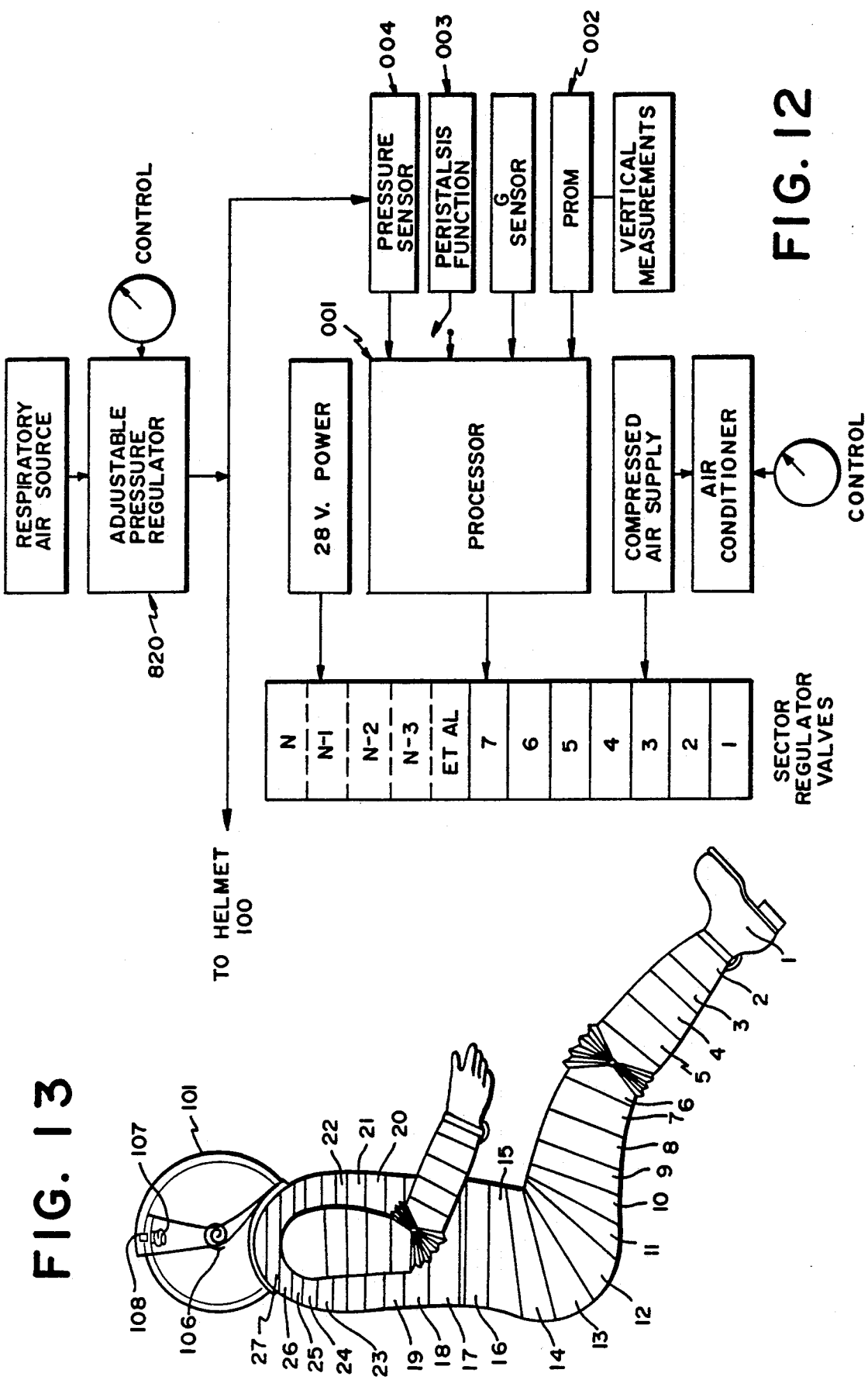

COMBINATION ANTI-G AND PRESSURE SUIT

RELATED DISCLOSURES

This application is related to Disclosure Document Nos. 154,609; 157,989 and 162,924, filed Aug. 13, 1986, Oct. 23, 1986 and Jan. 28, 1987, respectively.

BACKGROUND OF THE INVENTION

This invention relates to a combination anti-G and pressure suit, and in particular, to an immersion simulating anti-G and pressure suit intended for use by an aviator in a normal erect seated posture in a high performance aircraft.

High performance aircraft are capable of producing vertical accelerations exceeding the physiological capabilities of aviators. For example, sustained positive vertical acceleration of 4.5 G is the approximate upper human factor limit before loss of vision and loss of consciousness occur due to migration of body fluids, and particularly due to loss of blood pressure to the brain.

The limitation for negative vertical acceleration is about 3.0 G with risk of eye or brain damage. The limits are for gradual onset of acceleration, whereas many military aircraft are capable of rapid onset to vertical acceleration of 9.0 G or more in both positive and negative directions.

Anti-G suits in common current usage improve somewhat the human anti-G tolerance. Such suits utilize air pressure bladders in several parts of the lower body to counter body fluid migration and result in a G-tolerance improvement on the order of only about 1.0 G.

While using such suits, aviators are trained to bend forward and strenuously tension their stomach muscles and diaphragms in the so called "M 1 maneuver" to further increase their positive G tolerance to as much as +8 or 9 G. In addition, aviators are trained to monitor their peripheral vision since reduction of peripheral vision precedes the total loss of vision and consciousness.

The situation then is that a military aviator, wearing a conventional anti-G suit, while concentrating on attacking or evading an enemy, is obliged to divert his attention to decide whether his stomach and chest muscles are sufficiently strained to retain peripheral vision. The aviators physical limitations thus may very well be more critical to the result than the aircraft or weapon performance.

In prior art both liquid filled suits and liquid filled containers were intensively studied and tested both in flight and on human centrifuges. Acceleration tolerances of from 15 to 30 G were demonstrated. In principle, the migration of internal body fluids is prevented by matching external liquid pressures. In addition, liquid immersion provides neutral buoyancy, and body motions are not sensibly affected by the external acceleration forces. Liquid filled suits, on the other, hand transfer these forces to the limbs and body in addition to the acceleration forces of the liquid filled suit.

The great weight and bulk of these liquid systems was unacceptable for aircraft or rocket vehicles. Inability to inhale due to liquid pressures on the chest walls was the ultimate difficulty. All of the human centrifuge tests at the higher G levels were conducted with subjects holding their breath.

It is known from diving physiology that humans can easily hold their breath in free dives to 60 or more feet in a 1.0 G environment. This converts to 60/30 or two feet in a 30 G environment. However, breathing, as opposed to holding the breath at atmospheric pressure, is only possible to a depth of a few feet when immersed in a 1.0 G environment and only a few inches in a high G environment. The problem is that humans are incapable of expanding the chest and lungs against the acceleration-produced external liquid pressure. Prior art has attempted to deal with the respiration difficulties of liquid immersion by utilizing various pressure equalizing regulators such as the type used by skin divers.

One such prior art device is described in U.S. Pat. No. 3,137,290. The device is a liquid filled capsule which is intended to provide protection against G's and low pressure for crews of aircraft, manned space ships or other conveyances for humans. The liquid filled capsule is large enough to enclose the entire body of the crew member being protected, thereby providing the crew member's body with hydrostatic support from all directions. The liquid filled capsule is provided with external gas pressure means for stabilizing the liquid pressure at mouth level, a pressure equalizing regulator and a breathing mask.

Although the above-described and other similar immersion devices may offer improved G tolerance, it would appear that crew members would experience great difficulty in inhaling during positive acceleration and difficulty and some danger in exhaling during negative acceleration due to liquid pressures on the upper body. This problem can be of major concern when one considers that for aircraft usage the rate of change of acceleration can be many G per second. Therefore, the rate of change of respiration pressure is of the order of pounds per square inch per second. This is physically intolerable and may endanger the ear drums or lung tissue.

Another problem associated with fluid immersion is that the volume of the immersion fluid must vary to accommodate the expansion and contraction of the body during respiration without modifying the fluid pressure applied to the body. Following World War II, military anti-G suits evolved to their present form of pneumatic pressurization of parts of the lower body. Early versions of the anti-G suit were found to be valuable for wounded or shocked patients and have evolved into present day trauma or shock-suits. These have been found invaluable in restoring blood pressure and reducing fluid loss from wounds.

U.S. Pat. No. 2,667,459 discloses a ventilation system for spacesuits or other inflatable pressure garments.

U.S. Pat. Nos. 4,534,338 and 4,546,491 and others mention induced pressure changes and "milking action" in connection with anti-G suit operation.

SUMMARY OF THE INVENTION

It is an object of the present invention to provide an improved anti-G and pressure suit.

Another object is to provide a combined anti-G and pressure suit which provides for both positive and negative G protection during high rates of vertical acceleration.

Another object is to provide an anti-G suit which simulates liquid immersion from neck to toe, yet which does not involve the weight, bulk, and other complications associated with liquid immersion or liquid filled anti-G devices.

Still another object is to provide an anti-G and pressure suit which enables normal respiration at regulated constant pressure during gross vertical accelerations produced by an aircraft or spacecraft.

Yet another object is to provide an anti-G suit capable of providing external body pressures independent of ambient air pressure and protecting the wearer from gradual or sudden loss of ambient air pressure or the introduction of harmful or noxious gases into the ambient atmosphere.

Another object is to provide an anti-G suit capable of providing a flow of temperature conditioned air between the interior of the suit and the wearer's body for the comfort of the wearer during normal unaccelerated flight.

These and other objects and advantages of the present invention are accomplished, in one embodiment, by providing a combined anti-G and pressure suit which comprises a plurality of air-tight, individually pressurized tubes or segments which surround the wearer's body from the feet to the neck, and a separate helmet which is essentially isolated from the suit and which is supplied with respiratory air. The air pressure in the various segments, which may be controlled by a microprocessor, is continuously monitored and adjusted to match body fluid pressures resulting from vertical accelerations due to maneuvering. Constant respiratory air pressure is maintained in the helmet, and the segments which surround the upper body are pressurized to allow for substantially normal breathing during both positive and negative vertical acceleration.

During unaccelerated flight a flow of conditioned air between the suit and the wearer is provided. Respiratory and chamber air pressures are unaffected by cockpit ambient pressure, and interfaces between the anti-G suit and the aircraft need consist only of compressor air at about 50 psi, minor electrical power and vertical acceleration data. Good cockpit visibility, good peripheral vision, instant anti-G corrections and normal respiration while maneuvering are the salient features which characterize the present anti-G and pressure suit.

BRIEF DESCRIPTION OF THE DRAWING

The invention will be more fully understood and the various objects and advantages thereof will be more fully appreciated in view of the following description and drawings, wherein:

FIG. 11 is a partially schematic side view of the anti-G suit of FIG. 1 in a normal seated posture illustrating the vertical height, $V_h$ of the air tight pressure segments relative to a reference position $V_o$ located about six inches below the collar seal;

FIG. 12 is a block diagram illustrating one suitable means for individually controlling the pressures in all of the sectors in the suit shown in FIG. 1;

FIG. 13 is a schematic side view of the suit shown in FIG. 11 having numbered pressure segments for purposes of illustration;

DESCRIPTION OF THE PREFERRED EMBODIMENT

Figure 1:
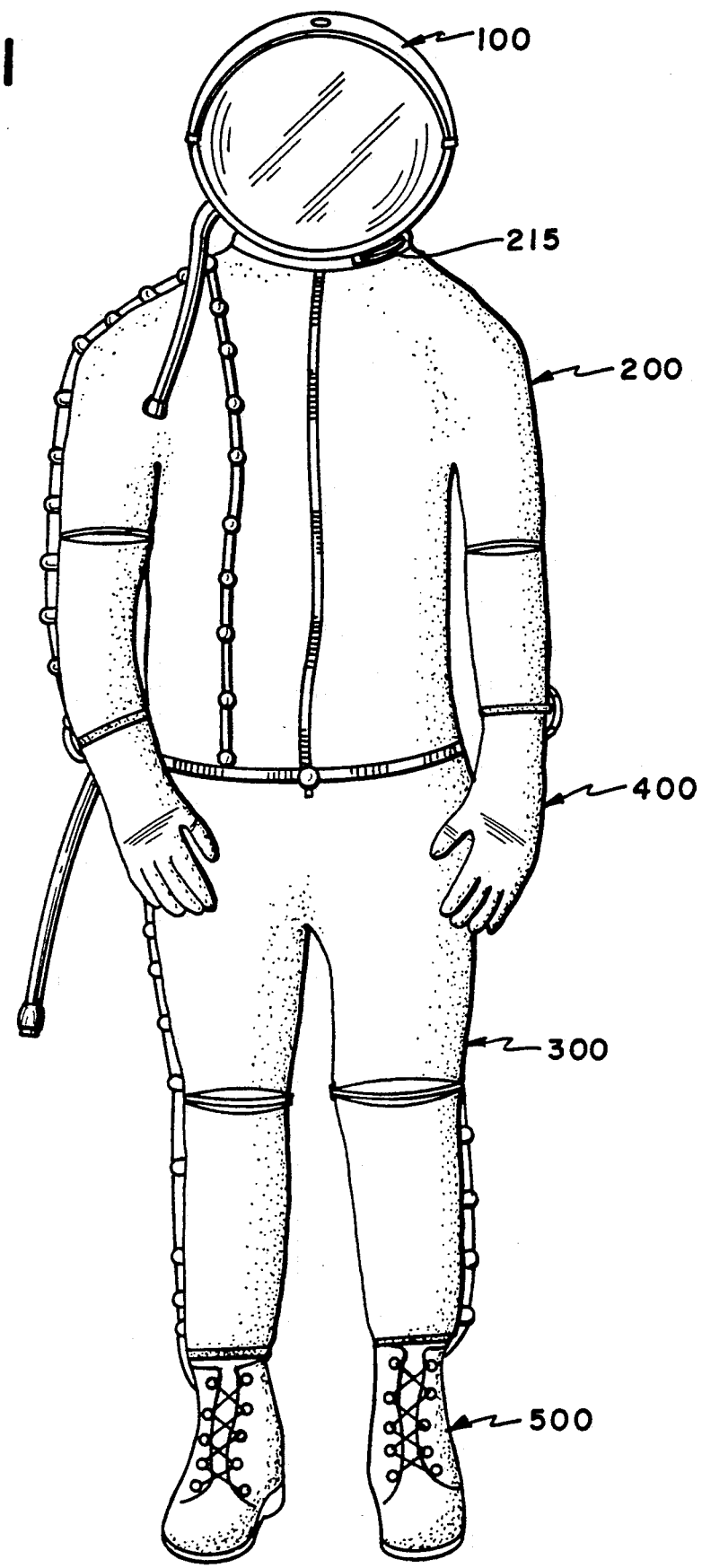
FIG. 1 is a partially schematic standing frontal view of one embodiment of the present anti-G suit illustrating a clear view spherical helmet, jacket, trousers, gloves and boots.

Referring to FIG. 1, there is shown a frontal standing view of the anti-G suit comprised of a clear spherical helmet 100, a jacket 200, trousers 300, gloves 400 and boots 500. These elements of the suit are joined by zippers, attachment rings or adhesive cloth as appropriate to a fully pressurized suit. As discussed more fully hereinbelow, the suit consists of an air impervious elastic inner layer or suit and a strong, flexible but non-distensible outer layer or exterior suit. The helmet 100, gloves 400 and boots 500 are individually pressurized from a source of compressed air. The jacket and trousers have the inner and outer suits separated into a plurality of air impervious torroidal segments or sectors. These segmented compartments encircle the wearer's body from the neck to the ankle and are stacked or arranged in the vertical direction relative to the heighth of the wearer in a normal standing position.

The air pressure in each of the individual sectors is controlled, for example, by means of a digital processor.

Figure 3:
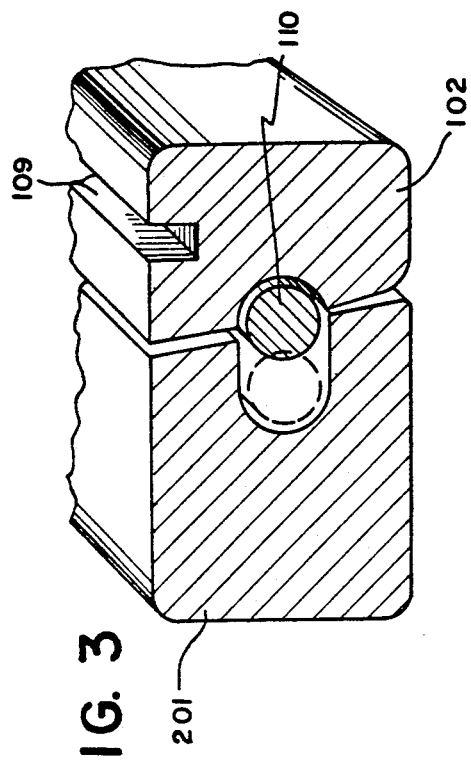
FIG. 3 is a partial perspective view of the helmet attaching ring shown in FIG. 2.
Figure 4:
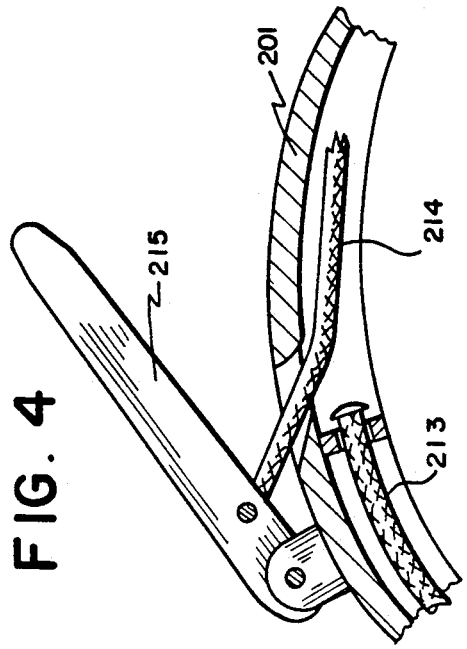
FIG. 4 is a partial view of the jacket mounting ring which cooperates with the helmet attaching ring shown in FIGS. 2 and 3.
Figure 6:
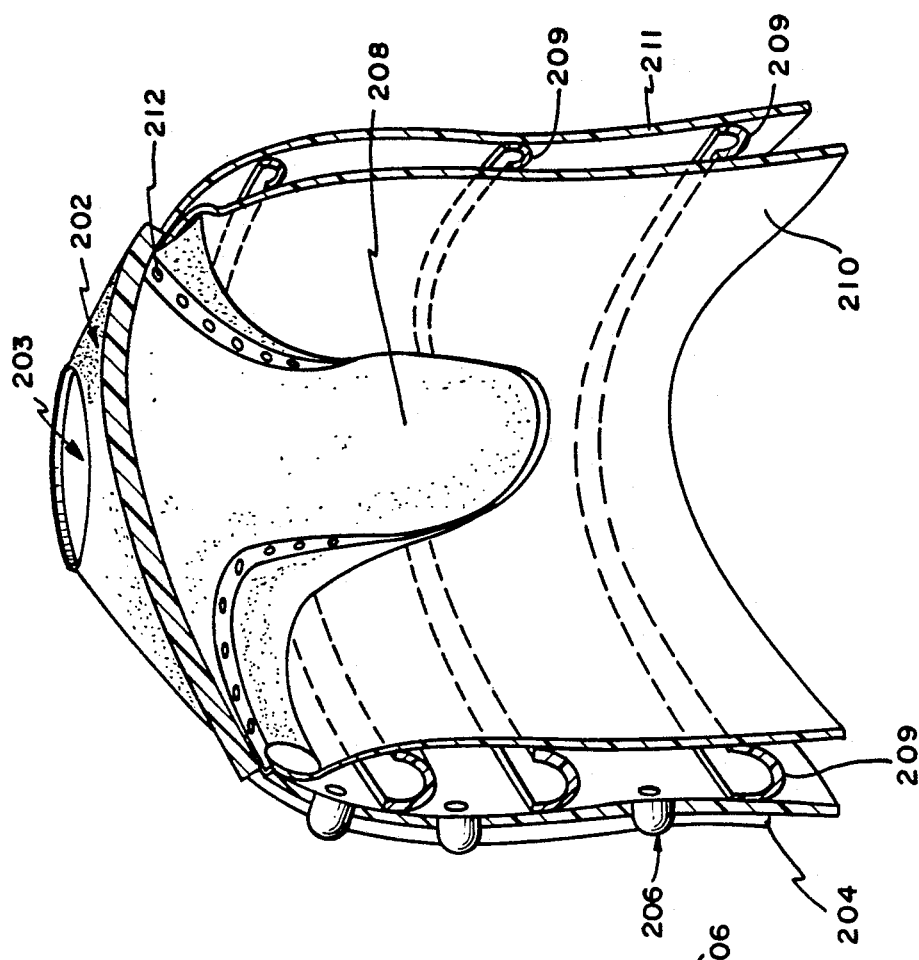
FIG. 6 is a left side sectional view of the jacket showing the arrangement of the horizontal air tight compartments or sectors, and details of the epaulettes or shoulder boards and collar seal which form a part thereof.
Figure 5:
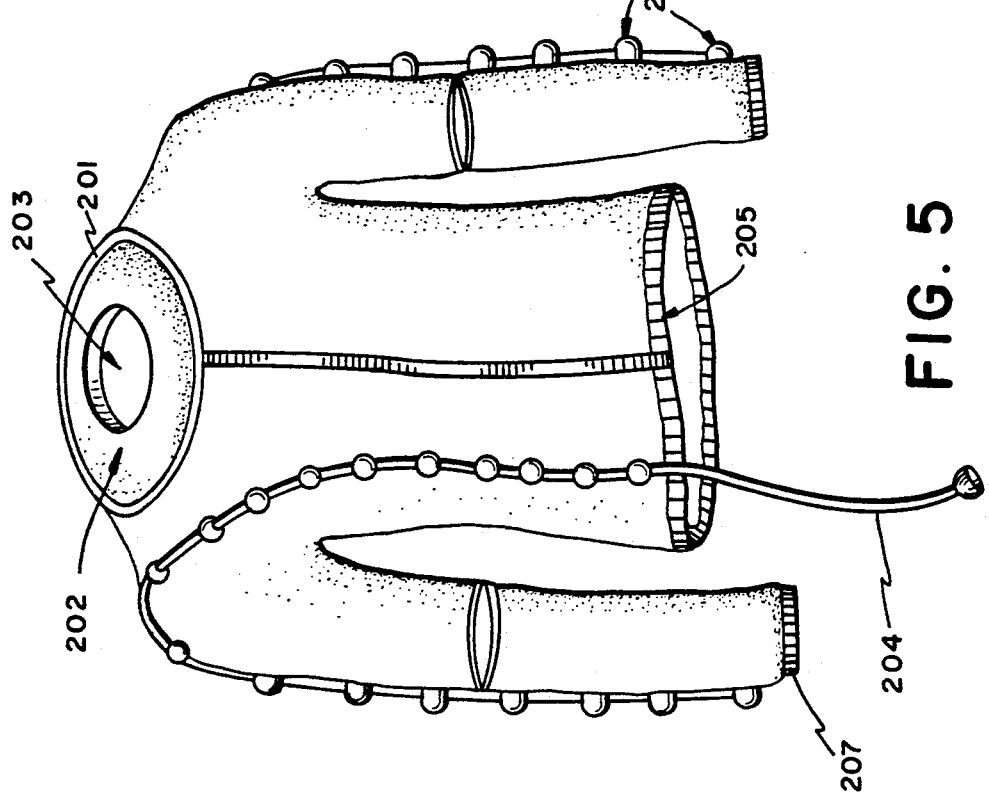
FIG. 5 is a frontal view of the jacket illustrating the jacket mounting ring and collar sealing arrangement.

The manner in which the helmet 100 is mounted to the jacket 200 is illustrated in FIGS. 2-6. A doubly curved helmet attachment ring 201 is attached to a soft flexible collar pressure barrier or seal 202. The wearer's neck is forced through the neck opening 203 in the collar seal 202. Zipper joints at the wrists 207, and waist and chest 205 facilitate putting on the jacket. A series of sector chamber pressure control valves 206 are shown in FIGS. 5 and 6, as are the air hose and connector 204.

Details of the horizontal pressure sectors or chambers of the jacket are best seen in FIG. 6. The flexible inner suit 210 is separated from the non-distensible outer suit 211 by the torroidal compartment dividers 209. Also shown are the control valves 206 for each compartment and the interconnecting air hose 204. Electrical control wiring, not shown, also runs to each sector control valve.

The inner suit 210 and the outer suit 211 join together and are sealed under the helmet attachment ring 201 and pass over stiff plastic shoulder boards or epaulettes 208. These epaulettes provide a support for the lower portion of the collar seal 202. During inverted flight or negative G forces the epaulettes 208 absorb the restraint forces of the aircraft shoulder harness and act to compress the collar seal 202 beneath the helmet attachment ring 201. The epaulettes also contain air outlet holes 212 for the purpose of ventilation during unaccelerated flight.

The function of the inner suit 210 is to expand elastically against the wearer's body, thereby transmitting sector air pressures to the body. The inner suit 210 and the chamber dividers 209 may be made from a wide variety of materials including, but not limited to, natural or synthetic rubbers, such as polyisoprene, polyisobutylene, buna-S rubbers, buna-N-rubber, polychloroprene, polyurethanes and the like. Vertical reinforcing cords may be molded into the material to provide tensile strength vertically while providing for horizontal expansion.

The outer suit 211 requires horizontal strength to contain sector pressures while retaining flexibility for normal body motion, particularly turning and twisting of the upper torso. This can be achieved by employing a composite material consisting of a grid or mesh of nylon, Kevlar, carbon fibers or the like imbedded or molded in a sealant material suited to aviation usage. The density of horizontal and vertical tensioning filaments may be varied to suit the design sector diameters and air pressures, as well as the flexibility requirements. The material should be suited to molding, gluing or stitching as required to join the chamber dividers and mount the sector valves.

Spacing between the outer and inner suits can be minimized to reduce bulk at most areas of the body, particularly at the hands and feet. However, in the chest area spacing of about one inch is allowed for respiration motions. This spacing is adequate for a six inch chest expansion.

Vertical spacing between sector chambers will vary over a range of from less than about one inch to about four to five inches. This will depend on the underlying anatomy and amount of body fluid involved. Boots and gloves may consist of single chambers for example. Narrow spacing is utilized over the torso and lower body.

Smaller vertical spacing reduces the pressure differential between sectors and would result in less discomfort, pinching, etc. during accelerated flight.

Figure 2:
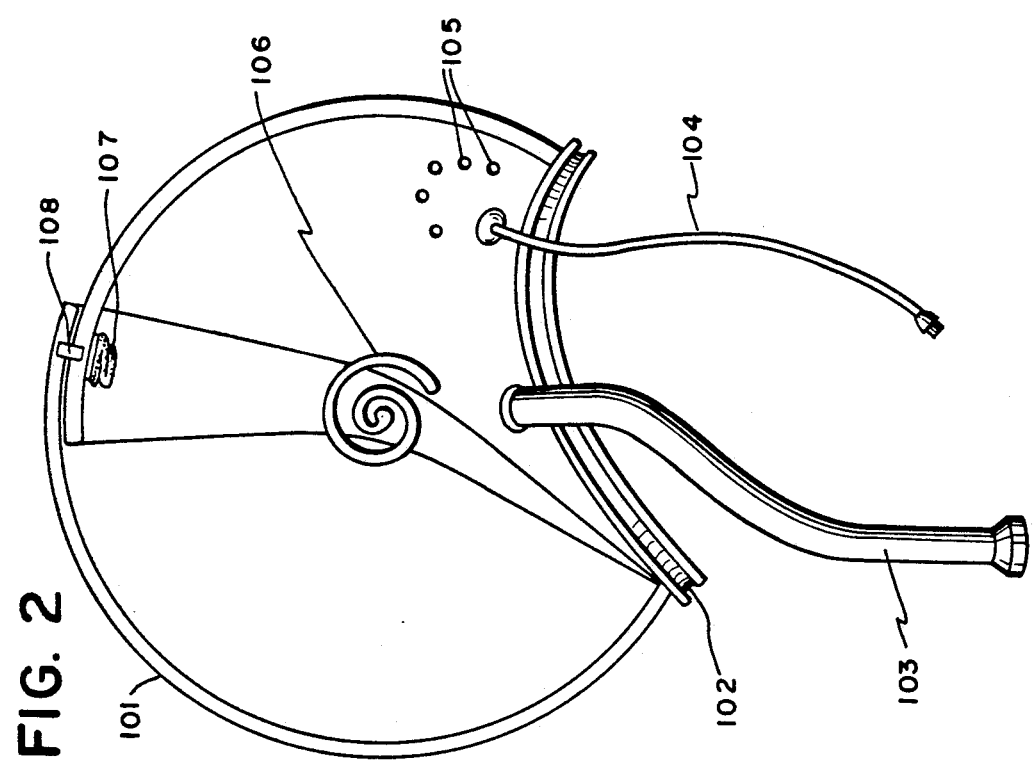
FIG. 2 is a side view of the helmet dome shown in FIG. 1.

FIG. 2 illustrates one embodiment of the helmet 100 preferred for all around visibility. However, pressure masks, face plates and various types of breathing apparatus and helmets are not precluded as pressurization methods. The helmet, which preferably comprises a polycarbonate spherical dome, incorporates a large spherical visor 101. The hinge points of the visor 101 are encircled by a coiled spring 106. Respiration air under pressure enters the helmet by means of a suitable hose and connector 103 and is distributed to the front of the helmet. Exhaust air escapes through sized orifices 105 at the rear of the helmet. A pressure transducer means, shown schematically as numeral 104 transmits the respiration pressure electrically to a digital processor.

An aneroid chamber 107 is vented to the helmet exterior air pressure. In the absence of helmet interior pressure of 1-2 psi, the aneroid pin 108 will retract and hinge spring 106 will raise the visor. This is a safety provision in case the respiration air flow is reduced. Details of the helmet attaching ring 102 and the jacket mounting ring 201 are shown in FIGS. 3 and 4, respectively. The location of mounting groove 109 for the polycarbonate spherical dome and the helmet attachment cable 110 are shown in the locked (solid) and unlocked (phantom) positions in FIG. 3. The secured end 213 of the locking cable, part of the jacket, the free end 214 of the locking cable, and the helmet locking handle 215 are shown in FIG. 4.

Figure 7:
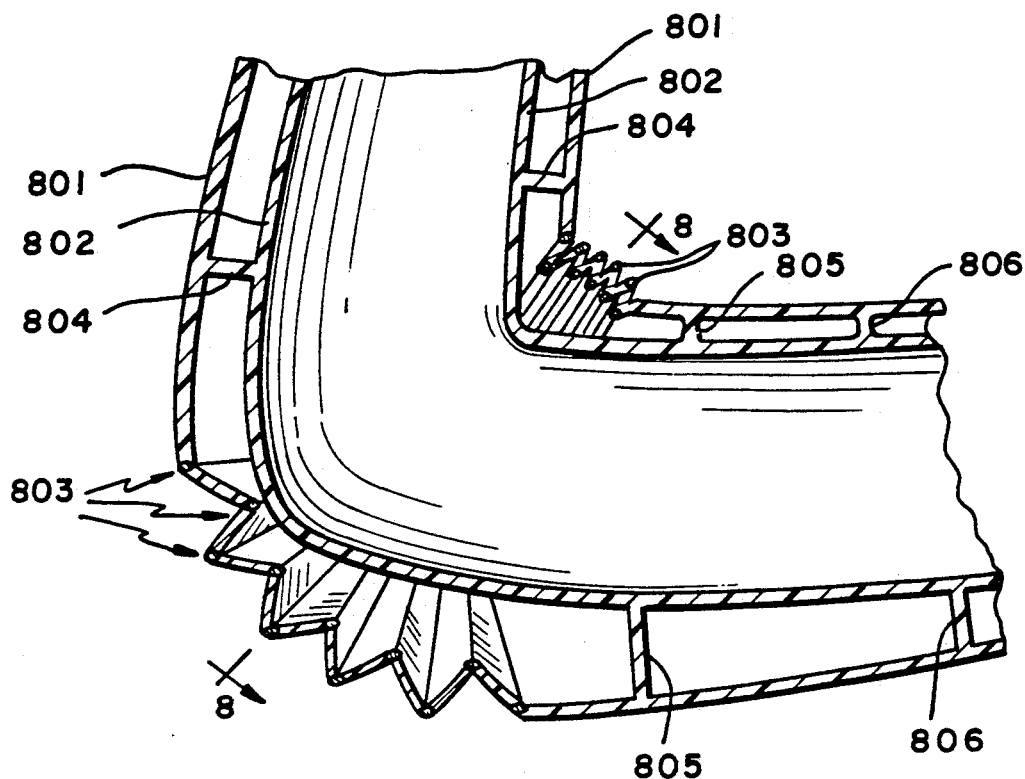
FIG. 7 is a partial sectional view of an arm or leg joint portion of the present anti-G suit.
Figure 8:
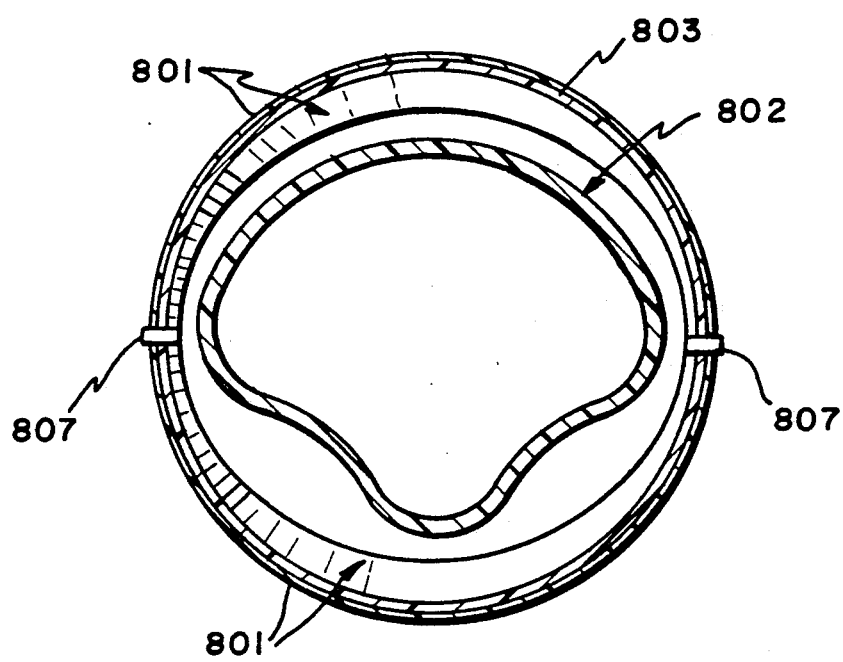
FIG. 8 is a sectional view through line 8—8 of FIG. 7.

Details of a pressurized knee or elbow joint are shown in cross section in FIG. 7. In this embodiment lightness and strength are desired with a hinge line closely matching the location of biological hinge line. The outer suit material 801 and the inner suit material 802 compartment the joint at the sector divider elements 804 and 805. An adjacent sector divider is shown at 806. The outer suit material is pleated or fluted in approximately circular arcs by the internal air pressure and the imbedded tension cords 803. These cords converge at a reinforced pivotal area 807 on each side of the joint. An internal cross section through the line 8—8 of FIG. 7 is shown in FIG. 8. The inner suit 802 is shown clear of the outer suit 801. The pleating arcs are larger on the outer or bottom side of the joint. The purpose is to facilitate joint flexure toward a mid position under increased pressure.

Figure 9:
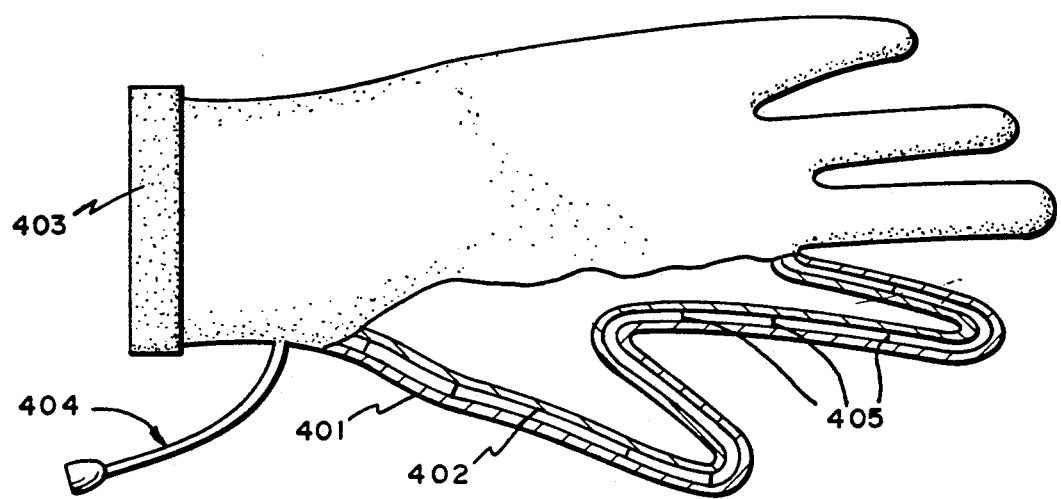
FIG. 9 is a sectional view illustrating one embodiment of a glove portion of the present anti-G suit.

FIG. 9 illustrates the internal construction of the gloves 400 and shows the outer fabric 401 and the inner fabric 402. The connecting lines 405 are not compartments, but short elastic connecting filaments to keep the inner and outer glove in alignment. The gloves are suitably attached to the jacket by a zipper 403, adhesive fabric or the like. An air hose and connector 404 supply air pressure from a valve on the jacket.

Figure 10:
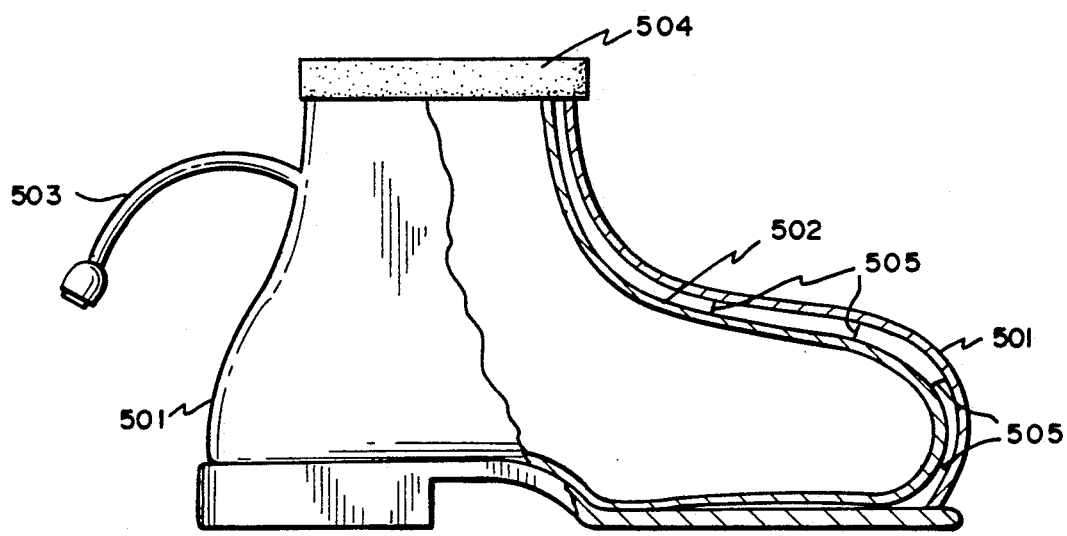
FIG. 10 is a sectional view illustrating one embodiment of a boot portion of the present anti-G suit.

The boots 500 illustrated in FIG. 10, are similar to the gloves and consist of an outer material 501, an inner liner 502, an air hose 503, a zipper attachment for the trousers 504, and elastic restraint filaments 505. The boots are subject to the highest pressures and rates of change of pressure. Glove pressures are relatively low.

The trousers 300 are constructed in the same manner as the jacket and includes compartmentation, control valves and zippers as necessary.

In FIG. 13, a side view of the suit in a normal seated posture is shown. The internal pressure segments of the suit are indicated and consecutively numbered from the boots upwards. A block diagram of the pressure control system is shown in FIG. 12.

The purpose of the control system is to generate suit segment pressures equal to the internal body fluid pressures due to acceleration and thereby prevent acceleration-induced body fluid migrations. Another purpose is to maintain a constant respiration pressure and to maintain constant external body pressures regardless of decreases in the external ambient atmospheric pressure.

The digital processor 001 utilizes three sources of data to calculate the required sector pressures. These are, first, the respiration pressure 004 obtained from the transducer 104 located in the helmet 100. This pressure originates in the adjustable pressure regulator 820. The second datum is the vertical acceleration data from an accelerometer normally available in the aircraft. The third datum is vertical segment height data. This data is manually measured and entered into the programmable Read Only Memory (PROM) 002 of the processor 001. These data are assumed to be constants.

Figure 15:
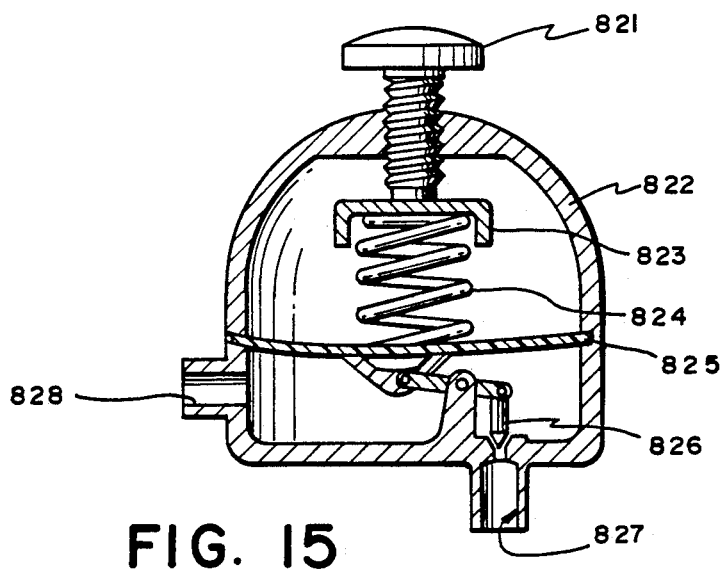
FIG. 15 is a sectional view of a respiration pressure regulator.

A respiration pressure regulator 820 is shown in cross-section in FIG. 15. High pressure air, at up to 80 psi, enters the regulator at the inlet 827 and is controlled by needle valve 826. The needle valve is controlled from a flexible diaphragm 825 and spring 824. The regulated air pressure is taken from the low pressure outlet 828. In operation, an increase in outlet pressure causes the diaphragm 825 to compress the spring 824, thus closing the valve 826. Low outlet pressure causes the spring 824 to open valve 826, thus raising the pressure. A control knob 821 is adjustable by the aviator and adjusts the spring tension through cup 823. Ambient atmospheric pressure is isolated from the interior by sealed dome 822. The output pressure is variable from 0-20 psi. The design is simple and rugged. Ample flow capacity is available to maintain constant pressure for respiration flow through the helmet and any leakages in the visor or collar seal. This regulator may be mounted on an ejection seat convenient to the aviator.

The method of obtaining the vertical height data is most clearly seen with references to FIG. 11. Several suit sectors have their vertical centers marked by the letter c. Measurements are recorded by tape measure for each individual in normal flight posture. Measurements are plus or minus from an arbitrary mid-chest location designated $V_o$.

Figure 14:
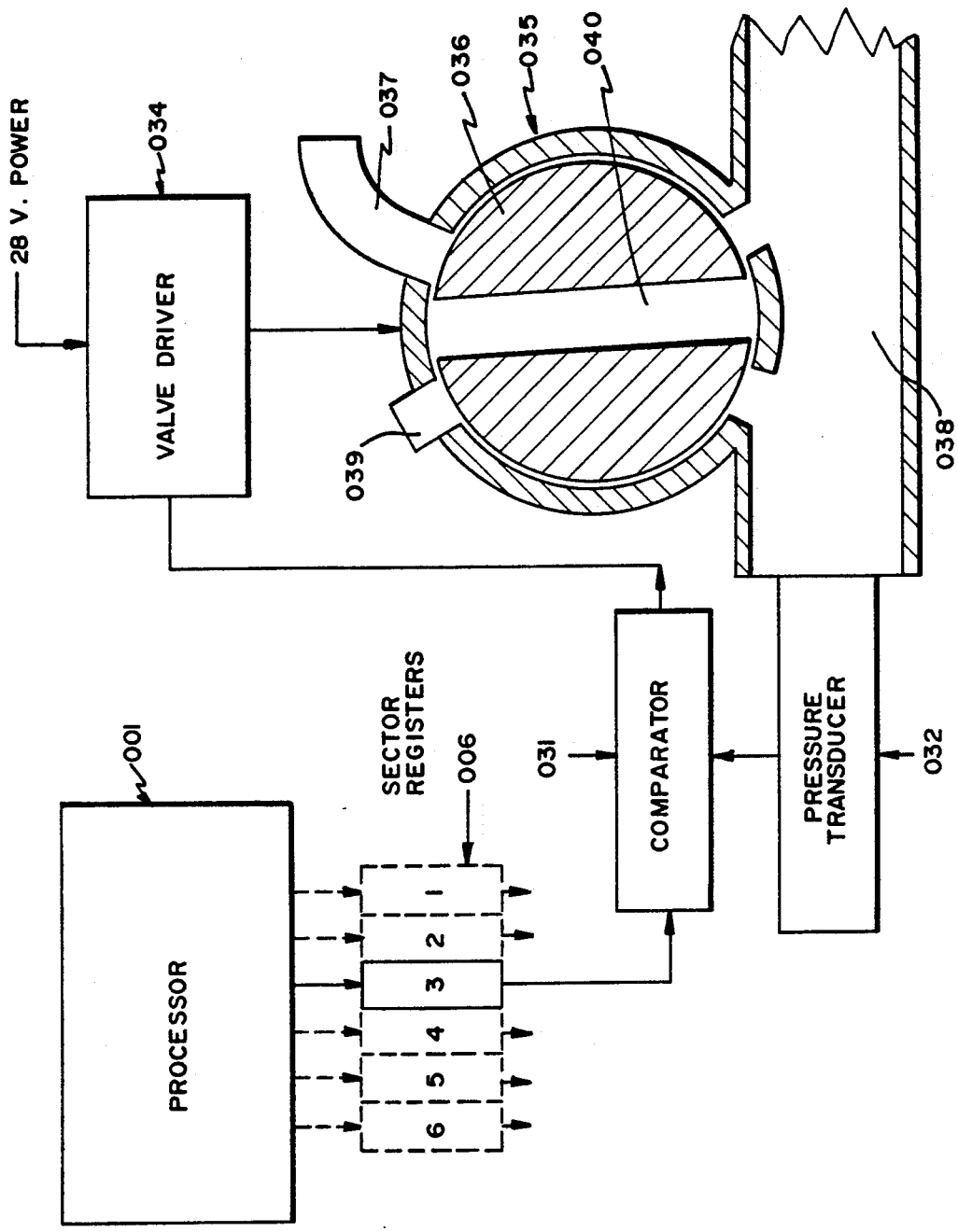
FIG. 14 is a partial sectional view of a servo control valve together with a block diagram illustrating one means for digital processor control of the valve.

With reference to FIG. 12, the vertical data constants are entered into the PROM section 002 of the digital processor 001. The processor then outputs a calculated value to a sector register for each valve in sequence. (Jet tactical aircraft have an abundant supply of compressed air available as well as low voltage electrical power to satisfy the requirements of the processor and associated hardware.) These are inputs to the sector regulator servo controls. One embodiment of a particular servo loop is shown most clearly seen in FIG. 14. The Processor 001 shifts pressure values in 8 level digital or other form to the sector registers 006 at a rate of 5 or more per second. The comparatory circuitry 031 compares the calculated pressure with the pressure in a suit sector chamber 038 as measured by the sector pressure transducer 032 resulting in a signal to the circuitry of the valve driver 034 to raise, lower or hold the sector pressure. This results in a signal to sector valve 035 which rotates the armature 036 clockwise to line up the valve passage 040 with the high pressure air inlet line 037. For lower pressure, the passage 40 is lined up with atmospheric vent port 039. Those familiar with the art will recognize the speed and accuracy capabilities of this closed loop servo action. The actual embodiment may be all or partly digital or analog.

In an alternative embodiment, the pressure transducer may be an aneroid bellows acting directly on the valve armature or sleeve. Design emphasis is on rapid response, light weight and small size with isolation from physical external acceleration effects.

Figure 24:
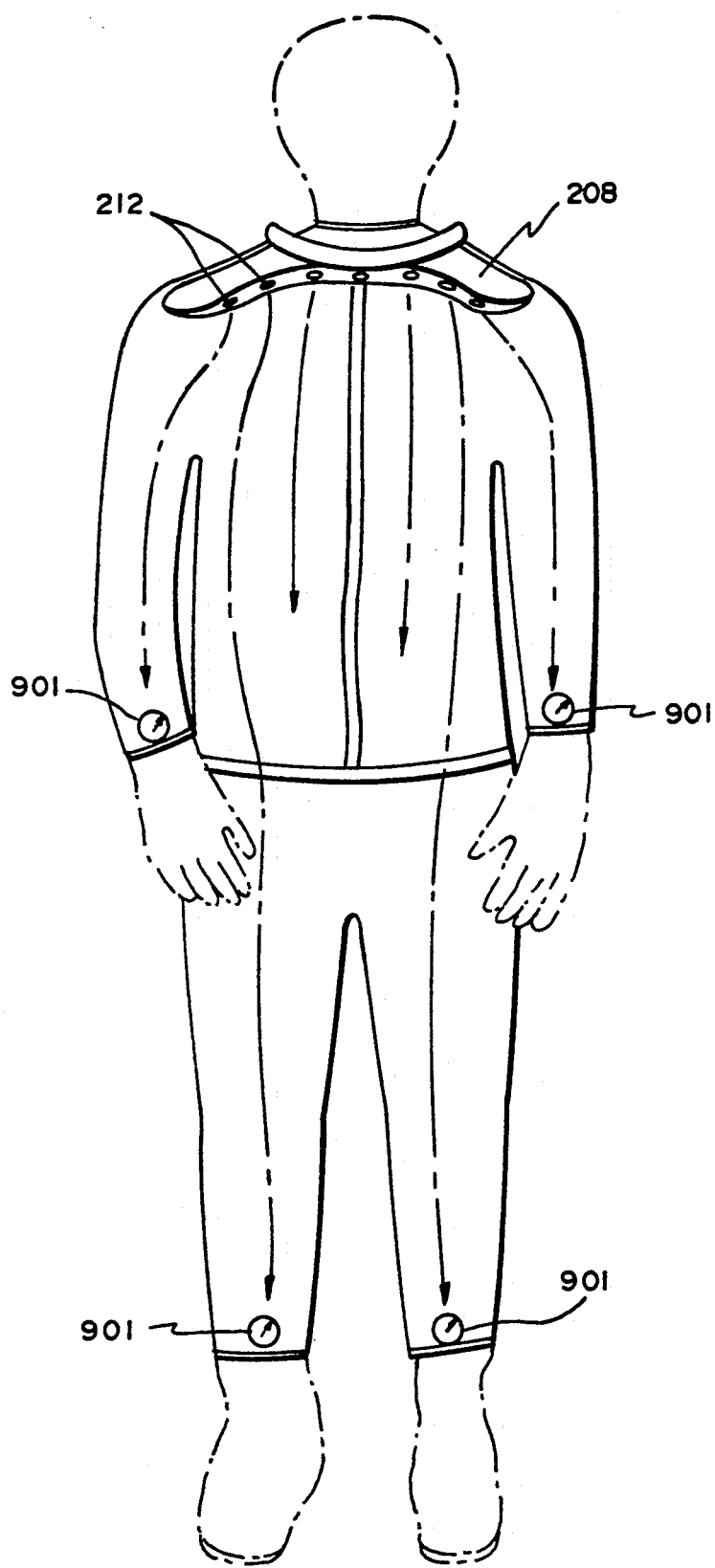
FIG. 24 is a schematic frontal view illustrating the flow of conditioned air through the present anti-G suit during unaccelerated flight conditions.

With reference to FIG. 12, compressed air is shown as an input to the sector regulator valves. The temperature of the conditioned air is adjustable by the aviator and the conditioned air is supplied to the epaulettes 208 (FIG. 6) through a single control valve (not shown). The conditioned air then passes through the air outlet holes 212 and into the suit as shown schematically in FIG. 24.

DETAILED FUNCTIONAL DESCRIPTION

Since the vertical acceleration of the aircraft can vary at a rate of several G per second it is necessary to calculate and adjust the pressure in each toroidal segment about 5 times per second. Rapid response is also necessary to insure that segment pressures surrounding the chest are not affected by suit interior volume changes due to respiration or other body motions. Thus, assuming a forty segment suit and five calculations per second, a cycle rate of 200 hertz is obtained. This is a modest cycle rate for current digital technology.

The equation solved by the processor 001 for calculating the segment pressure is as follows:

$$P_s = P_r + (Sg \times V \times G)$$

where
  r is the helmet respiration pressure;
  Sg is the gravity gradient of the body fluid. This may be taken as ten percent greater than water or 0.433 psi/foot times 1.1 or 0.476/foot at 1 G;
  V is the vertical center height of the segment relative to $V_o$
  G is the acceleration of gravity 32 feet/second squared. Only maneuvering acceleration is calculated and normal gravitation as in straight and level flight is taken as 0 G. Inverted straight and level flight would be minus 2 G for calculation purposes.

Figure 16:
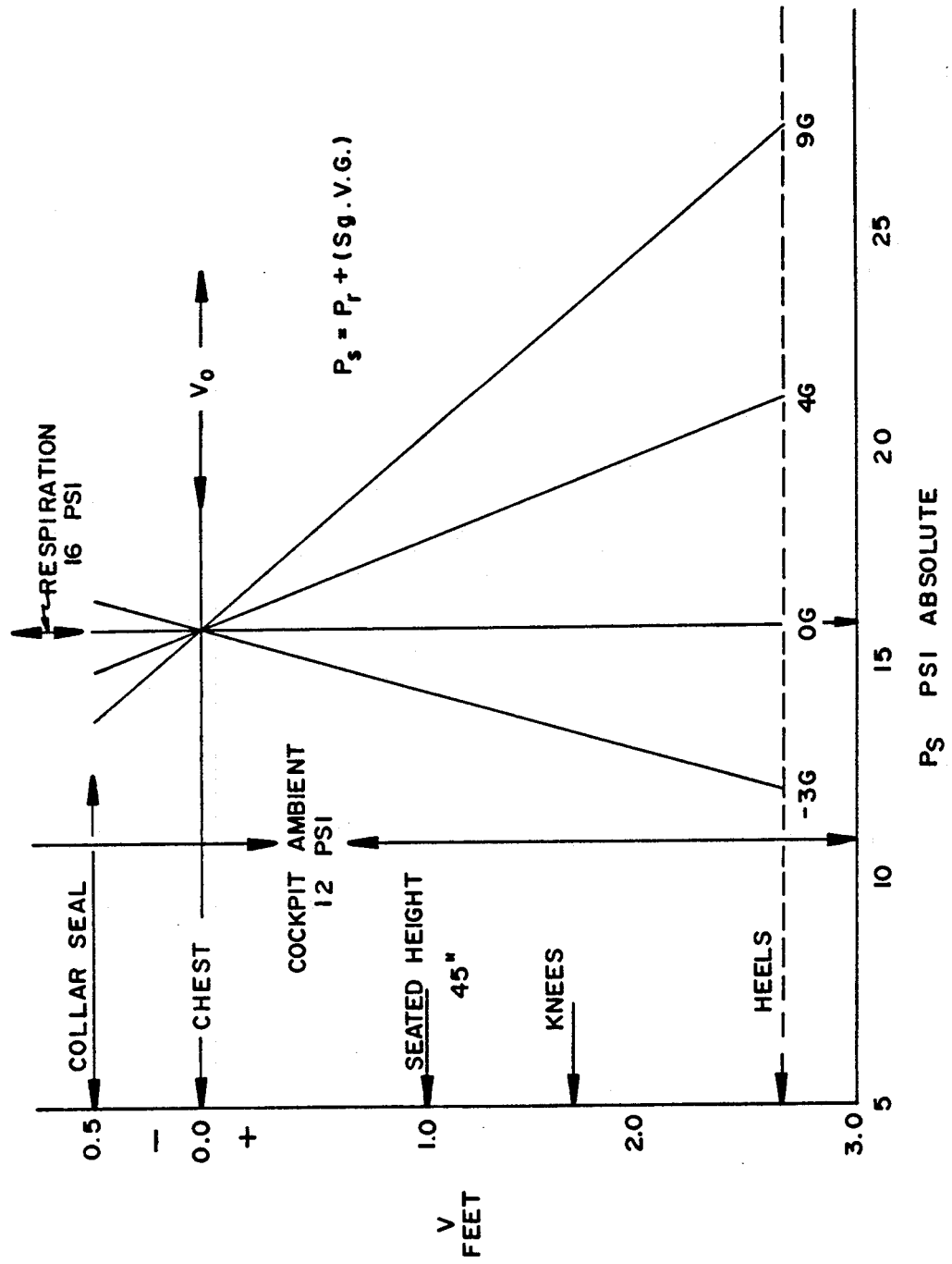
FIG. 16 is a graph of the sector pressures equation, wherein the sector pressure is plotted as a function of the vertical height of the sectors and the acceleration at a constant respiration pressure of 16 psi.

Referring now to FIG. 16, there is shown a plot of segment pressure, $P_s$, versus vertical height, in feet, for various accelerations. Respiratory pressure, $P_r$, is set at 16 psi and cockpit ambient air pressure is shown at 12 psi. A seated height of 45 inches is assumed with $V_o$ located at 32 inches from the heels. The collar seal is located 6 inches above $V_o$. From FIG. 16 the following points may be adduced:

1. As an aircraft maneuvers segment pressures are generated which match body fluid pressure gradients due to the acceleration. Respiration pressure in the helmet and at the $V_o$ location remain constant at 16 psi.

2. During positive accelerations segment pressures at locations above $V_o$ decrease. Pressures at locations below $V_o$ increase in the same proportion. Similarly during negative accelerations segment pressures increase above $V_o$ and decrease below. Thoracic external displacement due to respiration will encounter an average external pressure equal to the internal respiration pressure. Therefore, if the location of $V_o$ is correctly chosen, respiration effort will be unaffected by the external chest and abdomen pressures. Obviously, if $V_o$ is located too high, there will be difficulty inhaling and, if too low, difficulty exhauling under conditions of positive acceleration. The order of difficulties reverses for negative acceleration.

3. During unaccelerated flight or 0 G, all segment pressures are made equal to the respiratory pressure, $P_r$. Conditioned air at 16 psi will be able to pass through the suit between the wearer's body and the inner suit unimpeded by segment pressures acting on the body. This air discharges at approximately 16 psi at wrist and ankle orifices of the suit to ambient at 12 psi. Pressure across the collar seal is essentially zero.

Figure 17:
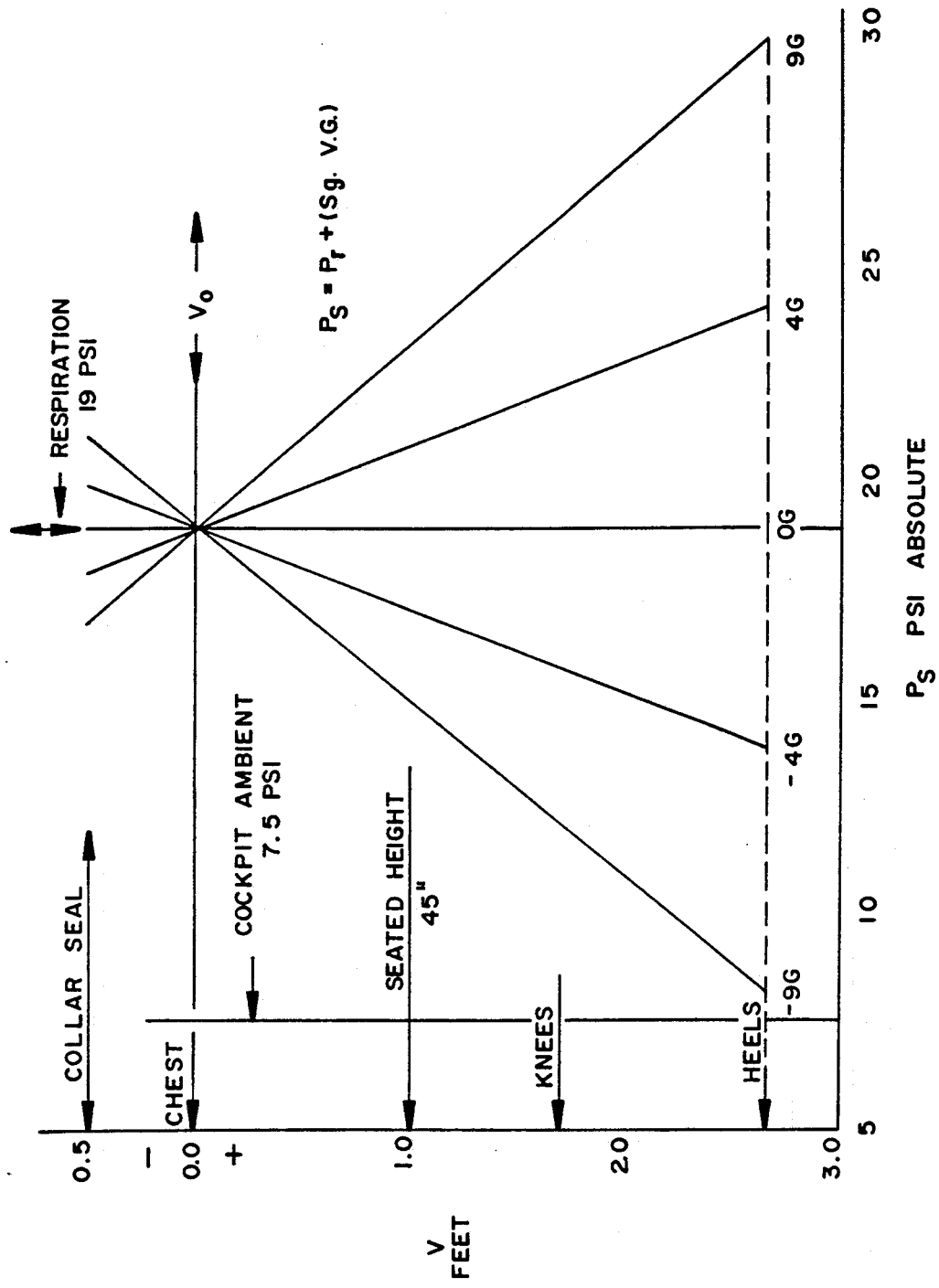
FIG. 17 is a graph similar to FIG. 16 plotted at a constant respiration pressure of 19 psi.

4. For the conditions depicted in FIG. 16 accelerations in excess of 9 G are possible. However, if negative accelerations in excess of 3 G are performed, segment pressures near the feet will reach cockpit ambient pressure at 12 psi. Since no segment can go below ambient, only partial negative anti-G protection would be available. The solution is to raise the respiratory air pressure or to lower the cockpit pressure. Reference may be made to FIG. 17, which shows a plot of segment pressure versus vertical height where the respiratory pressure is at 19 psi and the absolute cockpit pressure is at 7.5 psi. FIGS. 16 and 17 have been chosen to be illustrative of the negative G capabilities of the present anti-G suit. Aviators, however, are primarily concerned with positive acceleration and this capability requires only a slight increase in respiration pressure over ambient as these Figures indicate.

5. Gradual or sudden loss of cockpit ambient air pressure has no effect on the suit operation. This is because the respiration air pressure is regulated from spring tension and internal aneroid pressure in the regulator. Since this is the reference point for all other suit pressures, there is isolation from any external pressure variations.

During unaccelerated flight there is no pressure difference across the collar seal. Respiratory air flows into and out of the helmet and all suit sectors are maintained at the respiration pressure. Conditioned air also flows into the suit epaulettes 208 and passes between the wearer's body and the inner suit. The conditioned air leaves the suit at adjustable orifices 901 (FIG. 24) at the wrist and feet portions of the suit. The flow of conditioned air into, through and out of the suit is shown schematically by the arrows in FIG. 24. It should be noted that minor leaks through zippers or other joints are an aid to this circulation.

At the commencement of accelerated flight the conditioned air control valve vents to ambient.

During positive acceleration the collar seal 202 is compressed by the helmet attachment ring 102 against the wearers body. In addition, the pressure in the upper sectors of the suit, i.e., above $V_o$, is reduced to a pressure below the respiration pressure. The air pressure in the helmet dome acting on the collar seal 202 within the area of attachment ring 201 will provide an additional downward sealing force. Sealing ridges on the lower surface of the collar seal 202 may also be utilized.

For an acceleration of 9 G and a collar seal to $V_o$ distance of 0.5 feet, the pressure differential across the collar seal may be calculated as the difference between respiration pressure and the top segment pressure as follows:

$$P_r - (P_r + (Sg \times V \times G)) = P_r - P_r + (0.476 \times 0.5 \times 9.0)$$
$$= 2.14 \text{ psi}$$

Any leakage of the collar seal, although slight at this pressure, could migrate as far as $V_o$ where the segment pressure is equal to the helmet pressure. The result might be rapid exhalation and difficult inhalation for the wearer of the suit. However, the conditioned air inlet immediately below the collar seal acts to maintain the differential pressure of 2.14 and would be venting any leakage to ambient. It should be understood that the microprocessor 001 is continuously correcting the pressure in all of the segment chambers and it makes little differences if the inner suit 210 applies these pressures directly to the wearer's skin or indirectly through a pocket of trapped air. At locations below $V_o$ the conditioned air will continue to escape from the space between the wearer's body and the inner suit 210 assisted by the higher segment air pressures.

At the onset of negative acceleration the conditioned air central valve is vented to ambient and conditioned air is forced out of the suit through the conditioned air inlet and then through the conditioned air control valve to ambient by increasing air pressure above $V_o$. Conditioned air also continues to escape at the suit extremities. The collar seal 202 is heavily compressed by the suit occupant being forced against the shoulder boards 208 and the aircraft shoulder harness. Under these conditions some trapped air might be forced past the seal 202 and into the helmet 100. The respiration pressure regulator 820 has plenty of reserve capacity to deal with a minor air intrusion to the helmet.

Figure 18:
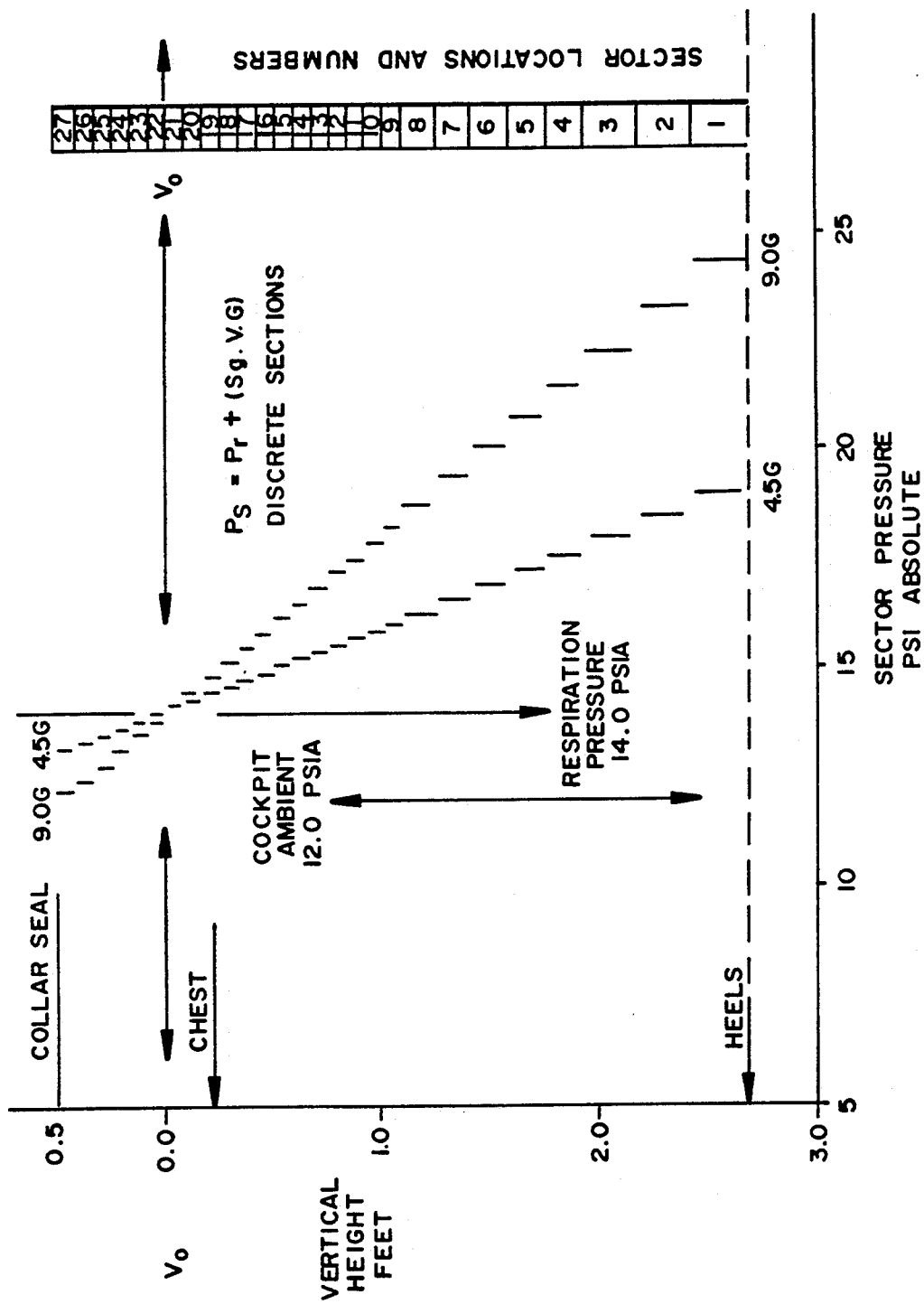
FIG. 18 is a graph of sector pressures versus the vertical height of the sectors, wherein the sectors are numbered to correspond to the numbered sectors shown in FIG. 13.

FIG. 18 illustrates the resultant sector pressures for 27 suit segments at +4.5 and +9.0 G. In reality many of the suit sectors would overlap in their vertical dimensions as is best seen in FIG. 11.

The anti-G and pressure suit of this invention is designed so as to allow a pilot to concentrate on tactical maneuvers, and so as to provide nearly instantaneous and accurate anti-G responses, as well as immunity from decompression if the canopy or cockpit pressurization fails.

In order to effectively use the suit, the pilot should perform the following procedures:
1. Set the respiratory air regulator to cabin ambient pressure.
2. Close the helmet visor.
3. Increase respiratory air pressure to the desired level.
4. Verify that all segments of the suit have inflated.
5. Adjust the conditioned air temperature as desired.
6. Occasionally monitor cockpit ambient air pressure.

It will be appreciated that the foregoing embodiments are illustrative rather than limitive of the present invention and that various changes and modifications may be made without departing from the spirit and scope thereof. For example, the microprocessor or other computer that is used to control the pressure in the various suit segments may be used as a test device, thereby facilitating the optimization and quantification of many design aspects of anti-G protection with a resulting minimization of costly human centrifuge testing. Some specific test areas in which the microprocessor or other computer can be used include, for example, the following;

(a) The effects of varying the specific gravity of the simulated immersion fluid could be determined. This would have the effect of causing the pressure in each segment of the suit to vary from the adjacent acceleration generated biological fluid pressures by precise increments. Data would consist of G tolerance variation and subjective observations. Distortion of respiratory organs due to inexact fluid pressure compensation and consequent shifting of the respiration balance point is anticipated as is the possibility of processor correction.

(b) The physical location of the thoracic displacement balance point $V_o$ can be shifted by biasing vertical height data in the processor memory. This provides the means for mapping the range of comfortable respiration at high G levels and the boundaries of discomfort and distress. In addition, the effect of various levels of respiratory over or under pressure on anti-G protection can be quantified.

(c) The effects of varying the size and spacing of the toroidal suit segments could be determined so as to provide data for optimizing the suit design. For example, several suit segments can be programmed in the processor to operate at identical pressures thereby simulating a single large segment in performance. The effects of a smaller number of larger segments at different locations can be simulated and subjective reactions obtained. Extended testing over the entire body area would provide invaluable design data. The test data should also provide valuable insights to the biological mechanisms of anti-G and trauma suits.

(d) FIG. 12 shows a peristalsis generator 003 as an optional input to the processor 001. This generator 003 produces low frequency oscillations for the purpose of modulating the segment pressure gradients during accelerated flight. The purpose is to produce pressure waves travelling against the direction of acceleration for the purpose of assisting in propelling venus blood, or other body fluids. Biological venous "check valves" may aid this process. The effectiveness of peristaltic waves could be readily investigated with a large number of narrow suit segments. It is also foreseen that a chambered suit could be a useful trauma or shock suit in aiding circulation and respiration. Also, constant chamber pressures could be programmed at a wound location to control bleeding.

Other modifications and changes within the scope of this invention will be apparent to those skilled in the art.

DESCRIPTION OF AN ALTERNATIVE EMBODIMENT

An alternative embodiment of the subject anti-G and pressure suit incorporates a different control method, i.e., one utilizing fluidic analog means. Except for the control method, the alternative embodiment of the anti-G suit is substantially the same as that described above. In appearance, the two embodiments are virtually indistinguishable.

The important differences may be summarized as follows:
1. The fluidic analog controlled suit requires no electrical wiring or connections to the aircraft.
2. The pressure transducer located in the helmet 100 is not required for the fluidic analog controlled suit.
3. Vertical height data is not required for the fluidic analog controlled suit
4. No accelerometer is required for the fluidic analog controlled suit.

In performance, both of the described embodiments are identical.

Figures 19, 20:
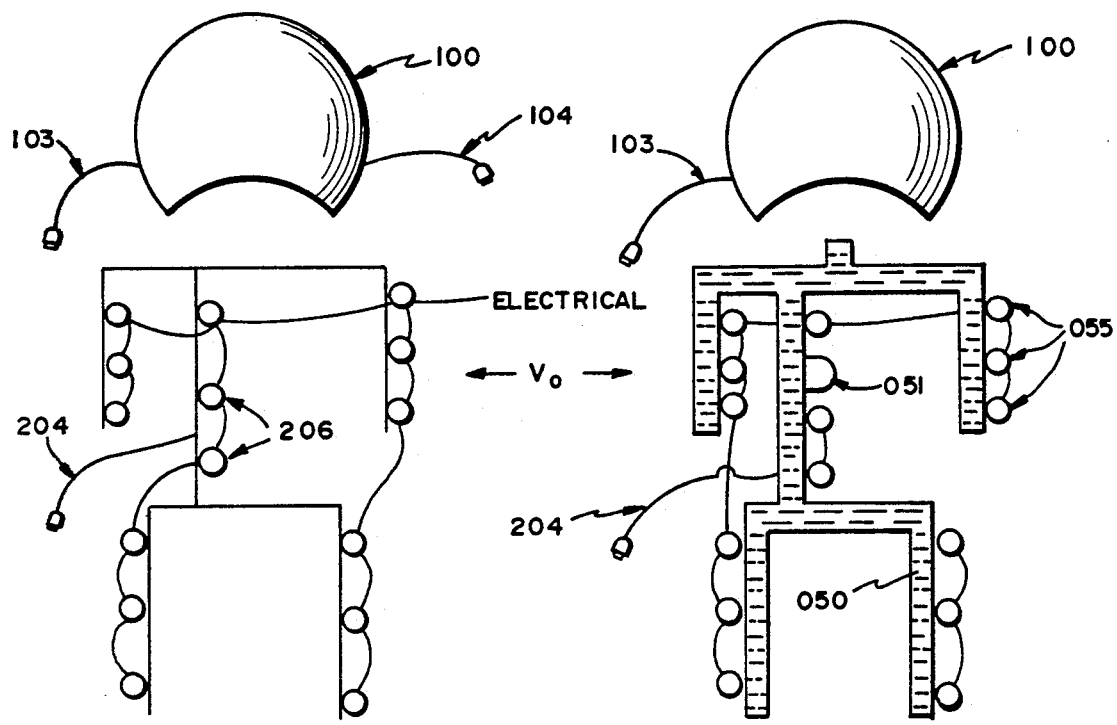
FIG. 19 is a schematic view illustrating electrical means for controlling the sector pressures and helmet pressure of the suit shown in FIG. 1.
FIG. 20 is a schematic view illustrating an alternative fluidic analog means for controlling the pressure in the various sectors and helmet.

The main differences are shown schematically in FIGS. 19 and 20. The previously described processor controlled embodiment (FIG. 19) includes a helmet 100 with respiration pressure hose 103 and pressure transducer cable means 104. A representative group of sector control valves 206 are all shown connected to the compressed air line 204, and electrical and signal wiring to each valve are also shown.

The alternative fluidic analog controlled embodiment (FIG. 20) also shows the helmet 100, respiration hose 103, but no pressure transducer. A different type of sector control valve 055 is employed and each valve 055 is connected to the compressed air source by hose 204, as before. Each sector control valve 055 is also connected to a closed liquid static pressure column 050. At the $V_o$ location, a fluid pressure transmitter 051 is also shown in contact with the static pressure column 050.

Figure 21:
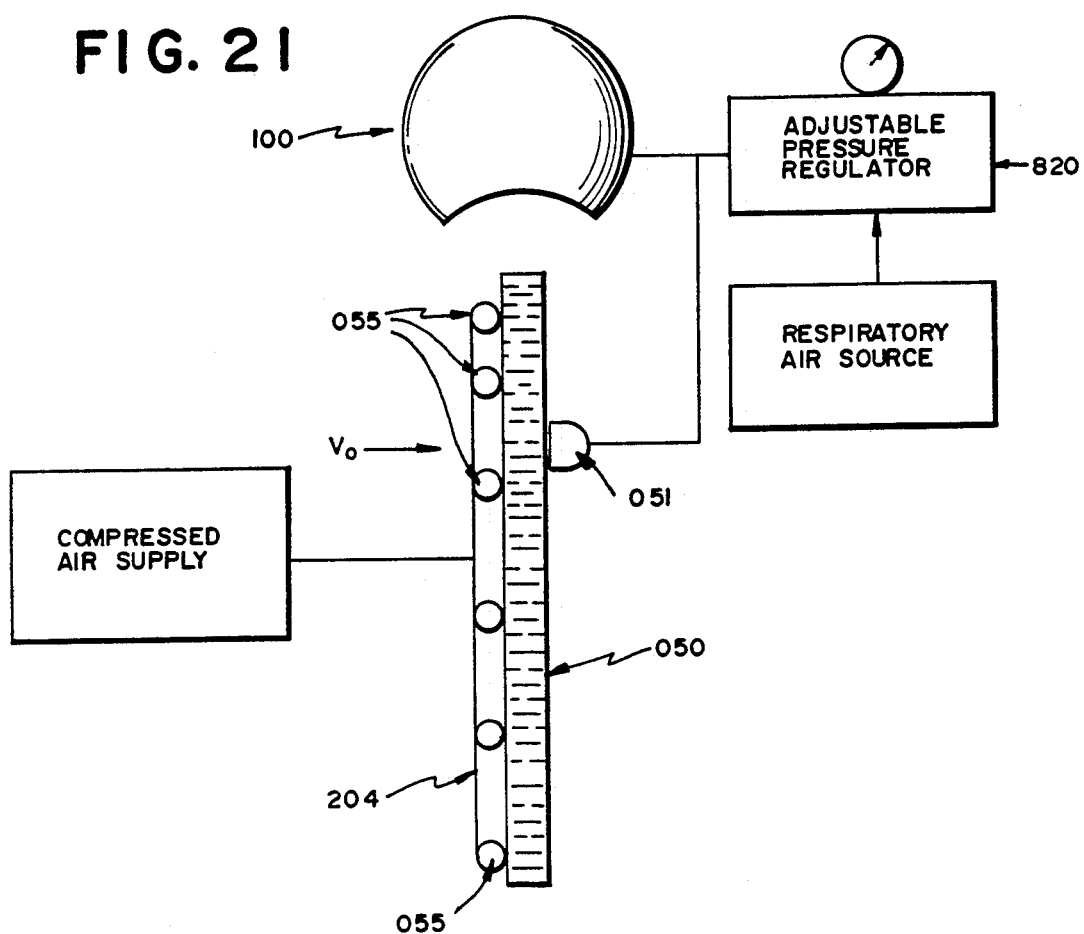
FIG. 21 is a schematic view illustrating the hydrostatic fluid column utilized for the alternative fluidic analog control.
Figure 22:
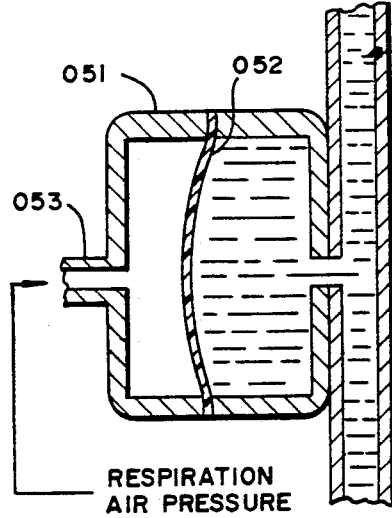
FIG. 22 is a partial schematic cross sectional view of the pressure controller utilized in the alternative fluidic analog control.
Figure 23:
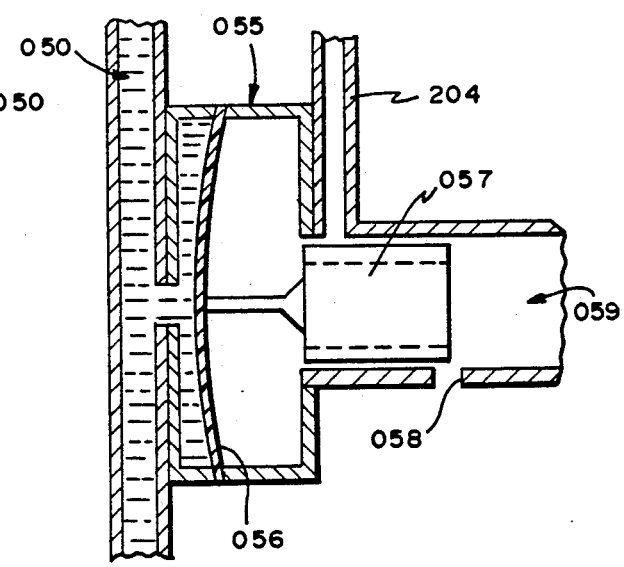
FIG. 23 is a partial schematic cross sectional view of a sector control valve utilized in the alternative fluidic analog control.

FIG. 23 depicts a fluidic sector control valve 055 in cross section. The cylindrical valve 055 incorporates a diaphragm 056 for separating liquid pressure from the static pressure column 050. High pressure air enters at 204 and is ported by sleeve valve 057 into the valve body 055 and into the interior of a suit sector 059. The sliding sleeve valve 057 also ports the sector pressure to ambient at port 058. In operation, increased pressure in the static pressure column causes the diaphragm 056 to move the sleeve 057 to allow high pressure air to enter through air inlet hose 204. Increased air pressure displaces the diaphragm 056 and the sleeve 057 closing off both the inlet hose 204 and port 058. Similarly reduced pressure in the static pressure column causes venting of the sector chamber 059. With reference to FIG. 22, the pressure transmitter 051 is shown in cross section. The transmitter 051 contains a highly distensible bladder or diaphragm 052 which separates liquid pressure from the static pressure column 050 from respiration air pressure which is introduced to the transmitter 050 from source tube 053. FIG. 21 schematically displays the control components and includes sector valves 055, compressed air line 204, static pressure column 050, and pressure transmitter 051. The helmet 100 receives respiratory air under controlled pressure from regulator 820. The static pressure fluid column 050 consists of plastic or other flexible tubing about ⅜ inch inner diameter. It is completely filled with a liquid such as a water-glycerine mixture or other suitable fluid having a specific gravity of about 1.05 to 1.15. In operation, the combination of positive or negative acceleration forces on the static pressure column 050, in conjunction with Pascal pressure introduced by the transmitter 051, results in varying pressures at the sector control valves 055. These pressures are a mechanization of the equation:

$$P_s = P_R + (Sg \times V \times G)$$

where $P_R$ is the respiration pressure applied to the static pressure column 050 through pressure transmitter 051, as well as to the helmet 100 (FIG. 21), and $P_s$, $Sg$, $V$ and $G$ are the same as above.

The function is therefore identical to that of the digital (processor) controlled embodiment. In operation, the flight procedures are the same. In other words, closing the helmet visor and raising the respiration pressure causes all sectors to inflate. Acceleration forces generate sector pressures as best shown in FIG. 18.

It will be seen that fluidic control, as described in this embodiment, eliminates vertical measurements as discussed in connection with FIG. 11 and that the alternate embodiment continuously corrects for limb displacements or postural changes. These movements are not uncommon in tactical flight maneuvers.

Those familiar with art will appreciate that the foregoing embodiments are subject to a variety of modifications or variations of the basic control function including electronic analog methods.

What is claimed is:

1. An anti-G suit adapted to simulate liquid immersion from the neck to the feet of a wearer thereof and capable of providing for both negative and positive protection during vertical accelerations, which comprises:

an inner, air-impervious, elastic suit adapted to fit from the neck to the feet over the body of the wearer;

an outer, air-impervious flexible, non-distensible suit adapted to fit from the neck to the feet over the body of the wearer, said outer suit being joined to said inner suit such that said inner and outer suits define a plurality of air-impervious separate toroidal segments which are adapted to encircle the wearer's body from the neck to the feet, said toroidal segments being stacked one upon another in the vertical direction when said suit is worn in the wearer's normal standing position;

helmet means adapted to be affixed to the neck region of said suit;

collar sealing means for preventing any air from leaking between said helmet means and the space between said helmet means and the body of the wearer in use;

means for introducing respiratory air into said helmet means at a controlled substantially constant pressure regardless of any gross accelerations to which the wearer is subjected;

means for exhausting exhaled air from said helmet means;

means for introducing and removing a pressurized gas into each of said toroidal segments, the pressure of the gas being transmitted during use to the body of the wearer through said inner suit; and means cooperative with said means for introducing and removing a pressurized gas into said toroidal segments for continuously adjusting the gas pressure in each respective segment during use in accordance with the following equation:

$$P_s = P_r + (Sg \times V \times G)$$

where $P_s$ is the gas pressure in each respective segment, $P_r$ is the pressure of the respiratory air in said helmet, Sg is the gravity gradient of the body fluid of the wearer in use, V is the vertical center height of each respective segment relative to an arbitrary mid-chest location ($V_o$) at which thoracic external displacement due to respiration will encounter an average external pressure equal to internal respiration pressure, and G is the acceleration of gravity, to match the internal body fluid pressures of the wearer encircled thereby in use resulting from vertical accelerations, thereby providing both positive and negative G protection.

2. The anti-G suite of claim 1, wherein said helmet means comprises a substantially spherical transparent helmet having an opening, a transparent visor, and means for pivotally mounting said visor to said helmet for selective movement between a closed position in which said visor covers said opening and an open position in which said visor opens said opening, said helmet means further comprising means cooperative with said means for pivotally mounting said visor to said helmet for automatically opening said visor in response to a lowering of the respiration air flow in said helmet below a predetermined level.

3. The anti-G suite of claim 2, wherein said means for continuously adjusting the gas pressure in said plurality of toroidal segments is capable of controlling the pressure in said segments which encircle the wearer at the region of said mid-chest location $V_o$ during use at substantially the same average pressure as the pressure of the respiratory air which is introduced into said helmet to essentially eliminate any breathing difficulties due to vertical accelerations.

4. The anti-G suite of claim 1, wherein said means for continuously adjusting the gas pressure in said plurality of toroidal segments is capable of controlling the pressure in said segments which encircle the wearer at the region of said mid-chest location $V_o$ during use at substantially the same average pressure as the pressure of the respiratory air which is introduced into said helmet to essentially eliminate any breathing difficulties due to vertical accelerations.

5. The anti-G suit of claim 4, wherein said means for continuously adjusting the gas pressure in said segments comprises microprocessor means for continuously measuring the air pressure $P_s$ in said segments and for comparing the measured air pressure with reference air pressure data with which it is programmed, and means for continuously adjusting said air pressure in said segments in response to any difference in the measured air pressure and the reference air pressure data.

6. The anti-G suite of claim 3, wherein said means for continuously adjusting the gas pressure in said segments comprises microprocessor means for continuously measuring the air pressure $P_s$ in said segments and for comparing the measured air pressure with reference air pressure data with which it is programmed, and means for continuously adjusting said air pressure in said segments in response to any difference in the measured air pressure and the reference air pressure data.

7. The anti-G suite of claim 1, wherein said means for continuously adjusting the gas pressure in said segments comprises microprocessor means for continuously measuring the air pressure $P_s$ in said segments and for comparing the measured air pressure, with reference air pressure data with which it is programmed, and means for continuously adjusting said air pressure in said segments in response to any difference in the measured air pressure and the reference air pressure data.

* * * * *